United States Patent
Wagner

(10) Patent No.: US 11,220,128 B2
(45) Date of Patent: Jan. 11, 2022

(54) APPARATUS AND METHOD OF IMPROVED PERFORMANCE OF HOT STAMPED FOIL

(71) Applicant: Lacks Enterprises, Inc., Grand Rapids, MI (US)

(72) Inventor: Guy Wagner, Tustin, MI (US)

(73) Assignee: LACKS ENTERPRISES, INC., Grand Rapids, MI (US)

(*) Notice: Subject to any disclaimer, the term of this patent is extended or adjusted under 35 U.S.C. 154(b) by 337 days.

(21) Appl. No.: 16/386,984

(22) Filed: Apr. 17, 2019

(65) Prior Publication Data

US 2019/0315152 A1    Oct. 17, 2019

Related U.S. Application Data

(60) Provisional application No. 62/658,735, filed on Apr. 17, 2018.

(51) Int. Cl.
| | | |
|---|---|---|
| *B44C 1/17* | (2006.01) | |
| *B60R 13/00* | (2006.01) | |
| *B44C 1/24* | (2006.01) | |
| *B62D 65/00* | (2006.01) | |
| *B62D 31/00* | (2006.01) | |

(52) U.S. Cl.
CPC .............. *B44C 1/1729* (2013.01); *B44C 1/24* (2013.01); *B60R 13/005* (2013.01); *B62D 31/00* (2013.01); *B62D 65/00* (2013.01)

(58) Field of Classification Search
CPC .......... B44C 1/1729; B44C 1/24; B44C 5/04; B60R 13/005; B62D 65/00; B62D 31/00
See application file for complete search history.

(56) References Cited

U.S. PATENT DOCUMENTS

| | | | | |
|---|---|---|---|---|
| 4,029,532 A | * | 6/1977 | Warhol | B62D 25/06 156/71 |
| 4,645,556 A | * | 2/1987 | Waugh | B41M 1/30 156/242 |
| 5,288,356 A | * | 2/1994 | Benefiel | B05D 7/16 156/196 |

(Continued)

FOREIGN PATENT DOCUMENTS

| | | | | |
|---|---|---|---|---|
| DE | 102007049195 A1 | * | 4/2009 | ........... B60R 13/005 |
| DE | 102011054865 A1 | * | 5/2013 | ............. B62D 65/00 |

OTHER PUBLICATIONS

English translation of DE102011054865.*

*Primary Examiner* — Sonya M Sengupta
(74) *Attorney, Agent, or Firm* — Dickinson Wright, PLLC

(57) ABSTRACT

A composite component includes a plastic substrate and a transfer foil adhered thereto. The plastic substrate and the foil are proud and define a peripheral edge with a tight outer radius. A thin first coating layer, such as a base coat or primer layer, is applied over the plastic substrate and foil and adheres the both the plastic substrate and foil. A thicker second coating layer, such as a clear coat, is applied over the first coating layer and adheres to the first coating layer. The first coating layer has a lower viscosity than the second coating layer. The second coating layer is more ductile than the first coating layer. The first coating layer acts a primer layer for applying the second coating layer. The second coating layer therefore protects the substrate and transfer foil and can withstand thermal shock and water immersion.

19 Claims, 2 Drawing Sheets

(56) References Cited

U.S. PATENT DOCUMENTS

| | | | | |
|---|---|---|---|---|
| 6,301,835 B1* | 10/2001 | Pfeiffer | ................ | B60J 5/0416 49/502 |
| 2004/0219366 A1* | 11/2004 | Johnson | ................ | B32B 27/08 428/423.1 |
| 2013/0283616 A1* | 10/2013 | Arns | ................ | C21D 1/673 29/897.2 |
| 2019/0299541 A1* | 10/2019 | Park | ................ | B60R 13/005 |

* cited by examiner

APPARATUS AND METHOD OF IMPROVED PERFORMANCE OF HOT STAMPED FOIL

CROSS-REFERENCE TO RELATED APPLICATIONS

The present application claims the benefit of U.S. Provisional Patent Application No. 62/658,735, filed Apr. 17, 2018 and titled "Method of Improved Performance of Hot Stamped Foil," which is hereby incorporated by reference in its entirety.

TECHNICAL FIELD

The present disclosure relates to automotive body components. More particularly, the present disclosure relates to automotive body components having transfer foil features and a method for applying a protective layer to the transfer foil feature.

BACKGROUND

Automobile bodies and in particular the exterior surfaces of automobile bodies are known to provide structural and cosmetic benefits in the automotive industry. The automobile bodies include various segments, including bumpers, exterior panels, grills, and the like. These segments provide protective benefits, both to the occupants of the vehicle in the event of collisions and the like, as well as providing protection to various internal components.

Automobile bodies further provide the benefit of distinguishing a particular automobile make or model from others. Consumers typically make a choice in purchasing an automobile based on a variety of factors, including road performance, comfort, safety, infotainment options, and aesthetic features.

Automobiles frequently include a variety of decorative aspects, in the form of logos, shapes, patterns, or the like, which are important to the consumer. Accordingly, manufacturers frequently apply a variety of decorative aspects to various parts of the automobile body. These decorative aspects can be applied both inside and outside the vehicle.

In the case of applying decorative features outside of the vehicle, the features may be exposed to extreme temperatures, such as high levels of sunlight. Extreme temperatures may also occur inside the vehicle. Accordingly, decorative features must typically be resistant to thermal shock. During the manufacturing and design process, decorative features may be subjected to thermal shock testing to ensure that such features can withstand extreme temperatures and remain intact while also remaining aesthetically pleasing.

Additionally, and in particular in the case of external applications, decorative features may be exposed frequently to water, such as rain, snow, or when the vehicle is being washed. Accordingly, the decorative features must be resistant to water, and in many cases must be resistant to high-pressure water sources, such as when being cleaned.

One process for applying a logo or other decorative feature to a structural component, such as a substrate, includes the use of transfer foil. Transfer foils may come in various shapes, sizes, and colors. A transfer foil may be applied to a substrate such that the pattern or logo will adhere to the surface of the substrate.

One process for applying a transfer foil to a substrate is a hot stamped foil process. In a hot stamped foil process, a die is heated, which presses the foil material against the substrate, fixing the foil to the substrate in the pattern defined by the shape of the die. Hot stamping may therefore provide a decorative benefit, creating a composite component including the substrate and the foil layer. However, hot stamped foils may have difficulty meeting various requirements for automobile decoration. For example, when exposed to heat or water, the hot stamped foil may deteriorate or otherwise become damaged.

Applications of transfer foil (i.e., hot stamped foil, or "HSF"), to composites such as plastics (e.g., polymers), can have decorative benefits to the transportation market, among others. However, the performance of some plastics covered with HSF may not comply with the requirements for exterior surfaces of a vehicle (e.g., an HSF/plastic grille). For example, some of these requirements can include ultraviolet (UV) light stability, abrasion resistance, salt spray, and temperature extremes, which can be used to simulate operational environment(s) of the vehicle.

In order to improve the durability of an HSF-covered plastic component, a clear coating ("clear coat") may be applied over the HSF. The clear coat can offer additional protection to the HSF from UV, abrasion, and impact damage, for example. However, the clear coat can also suffer from adhesion issues bonding to the HSF. Depending upon the type of HSF, the clear coat can be prevented from sufficiently bonding to the HSF due to, among other things, residue from at least one release layer that can be present with the HSF. The release layer(s) is present to allow the HSF to transfer from the HSF application sheet to the plastic component effectively, without traces of the HSF remaining on the application sheet and allowing for a consistent application of the HSF to the plastic component. Additionally, exudates or "bulk" can seep out of the HSF from between a protective layer and/or a coloring layer of the HSF, further complicating the effective bonding of the clear coat to the HSF. For example, some colored HSFs have been shown to interfere and/or reduce the adhesion of the clear coat applied to those HSFs, such as in tests including ASTM D 4541 (Pull-Off Strength of Coatings) and/or Thermal Shock Test for Coatings.

Moreover, hot stamped foils produce a product design with a proud surface relative to the substrate and a peripheral edge of the design having a very small radius, such as a 0.2 mm radius at the peripheral edge. Small radiuses can be difficult to apply a coating that will adhere to peripheral edge. Furthermore, it can be difficult to apply a coating that will adhere to the foil material as well as the plastic substrate material.

In view of the above, improvements can be made to the performance of hot stamped foil in the automotive and transportation market.

SUMMARY

It is an aspect of the present disclosure to provide a method of coating a hot-stamped foil that is resistant to thermal shock testing and water immersion testing.

It is a further aspect of the present disclosure to provide a composite component having a plastic substrate and a foil feature applied thereto with a protective coating.

It is another aspect to provide a molded component having a decorative feature that is suitable for use in the transportation market and can withstand environmental exposure.

In accordance with these and other aspects, in one aspect of the invention, a method of applying a two-component coating to a hot stamped foil plastic component includes providing a plastic substrate and applying a foil to the plastic substrate. The foil and the plastic substrate may be proud.

The method further includes applying a first coating layer over the foil and the substrate, the first coating layer having a first coating thickness and a first viscosity. The method also includes applying a second coating layer over the first coating layer, the second coating layer having a second thickness and a second viscosity.

In another aspect, a composite decorative component having a multi-layer coating is provided. The component includes a plastic substrate and a hot-stamped foil attached to the first surface of the plastic substrate. The hot-stamped foil and plastic substrate are proud.

The component includes a first coating layer attached to the hot-stamped foil and the plastic substrate. The component further includes a second coating layer attached to the first coating layer, wherein the second coating layer is thicker than the first coating layer.

In yet another aspect, a decorative component for an automobile resistant to thermal shock and water immersion is provided. The decorative component includes a plastic substrate and a foil adhered to the plastic substrate and projecting from the substrate.

The decorative component further includes a radiused peripheral edge of the plastic substrate and foil. A primer layer is adhered to the plastic substrate and the foil, and a coating layer adhered to the primer layer.

Additional aspects are described herein within the description and the appended claims.

BRIEF DESCRIPTION OF THE DRAWINGS

The drawings described herein are for illustrative purposes only of selected aspects and not all possible or anticipated implementations thereof, and are not intended to limit the scope of the present disclosure.

DETAILED DESCRIPTION

In the following description, details are set forth to provide an understanding of the present disclosure. In some instances, certain systems, structures and techniques have not been described or shown in detail in order not to obscure the disclosure.

In general, the present disclosure relates to a composite component and a method of improving the performance of hot stamped foil as it relates to the transportation market involving the application of a primer coat and clear coat. An example of the result of the method according to aspects of the disclosure is shown in FIG. 1-FIGS. 2A-2B.

The composite component and method of improving the performance of hot stamped foil as it relates to the transportation market involving the application of a primer coat and a clear coat of this disclosure will be described in conjunction with one or more example aspects. However, the specific example embodiments disclosed are merely provided to describe the inventive concepts, features, advantages and objectives with sufficient clarity to permit those skilled in this art to understand and practice the disclosure.

Figure 1:
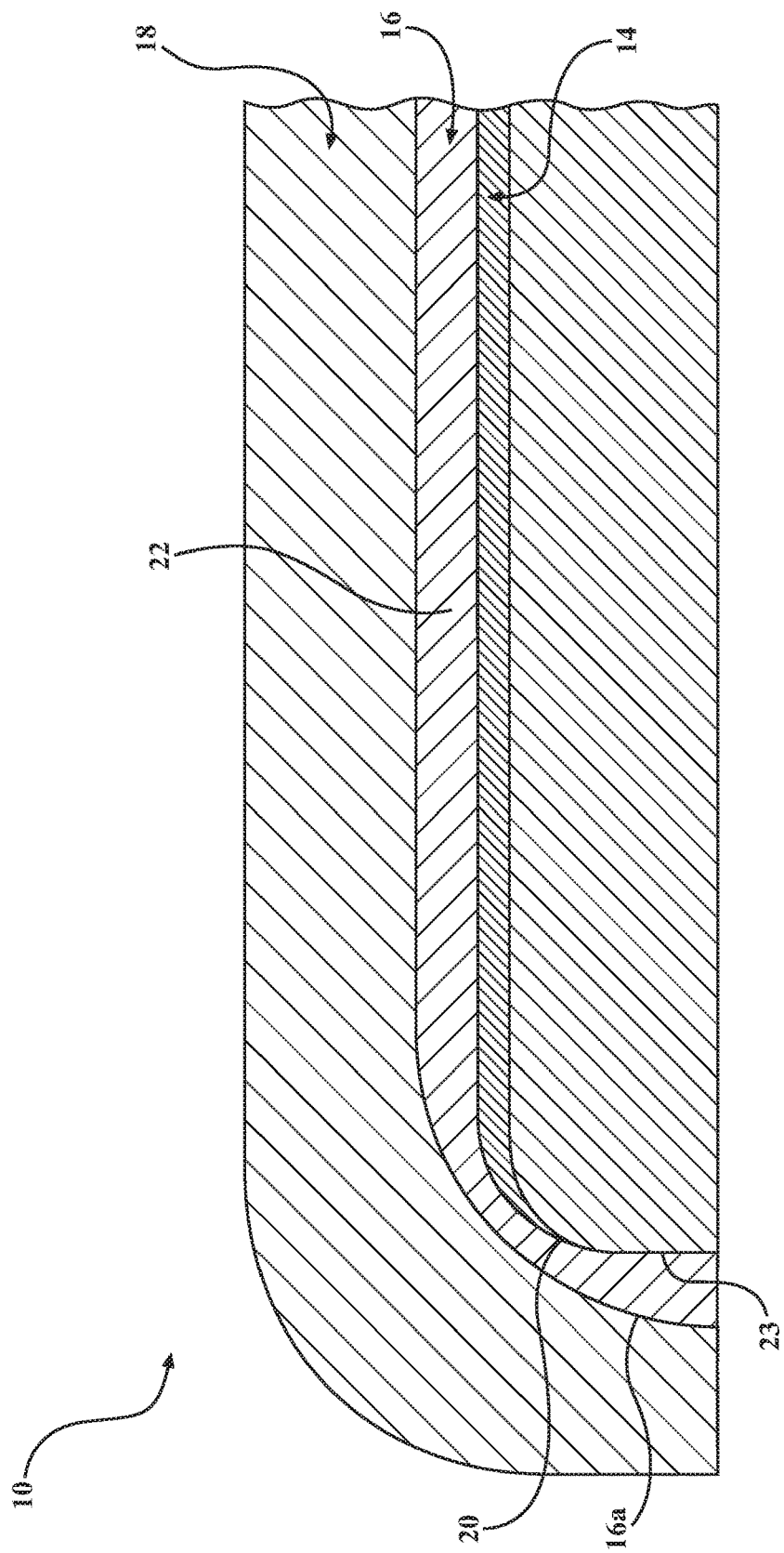
FIG. 1 is a cross-sectional view of a plastic substrate covered with a layer of hot stamped foil, a primer coat and a clear coat according to aspects of the disclosure.

With reference initially to FIG. 1, illustrated is a non-limiting example of an overall two-component coating system 10 for use with HSF on a plastic component 12 (such as ASA). The ASA component 12 is provided, which may be a component for use in or on a transportation vehicle (such as a vehicle grille). However, it will be appreciated that the component 12 and system 10 may be used in other applications outside of the transportation field and provide benefits similar to those described herein.

The ASA component 12, which may also be referred to as a substrate, includes a proud outer radius 20 that may be measured at 0.2 mm adjacent to a level surface 22. It should be understood that ASA component 12 may include other surface contours and that outer radius 20 and level surface 22 are exemplary and not limiting. According to another aspect, the ASA component may include a compound radius having a maximum radius of 0.8 mm and a maximum radius of 0.25 mm at the tear off point of the foil. An transfer foil layer 14, which may also be referred to as an HSF layer, is applied on top of the ASA component 12, including over outer radius 20 and level surface 22. It will be appreciated while the phrase HSF layer is used, the HSF layer 14 may include of one or multiple different layers. For example, the HSF layer 14 may include an adhesive layer, a color layer, and a release layer. The adhesive layer is configured to adhere the HSF layer 14 to the substrate to which it is applied. The color layer is configured to provide the desired appearance of the HSF layer when applied. The release layer is configured to allow the HSF layer 14 to release from the die that is used to apply the HSF layer 14 to the substrate to which it is applied.

As described above, the HSF layer 14 may be colored, such as a chrome color. It will be appreciated that a variety of other colors are contemplated and can be substituted (e.g., high-gloss black, or other desirable color profiles). In the stamping process, the HSF layer 14 and the substrate 12 may be stamped together to define the outer radius 20 and to define the general profile of the decorative feature, such as the logo or pattern being produced.

Accordingly, the combination of the substrate 12 and the HSF layer 14 can be subsequently coated with a protective coating. As further described below, two coating layers may be provided over the substrate 12 and HSF layer 14.

A first coating layer 16 may be disposed over the top of the HSF layer 14 and may be applied as a base coat (i.e., primer), and may therefore also be referred to as the base coat 16. In one approach, the first coating layer 16 or base coat may be made of R925 clear coating (although other base coats/primers may be used), which is commercially available from NB Coatings of Lansing, Ill. The base coat 16 may be applied in a thin film sufficient to bond mechanically with the HSF layer 14 and the substrate 12, particularly around proud outer radius 12. NB R925 (or similar material) is a generally low viscosity coating, allowing the base coat 16 to adhere to both the substrate 12 and the HSF layer 14 as well as adhering the relatively small outer radius 20. NB R925 may be considered a relatively brittle material. Due to its low viscosity, NB R925 alone may be difficult to apply in a relatively thick layer, and when used alone can result in undesirable cosmetic properties, such as paint sags and drips. Application of the base coat 16 may be referred to as "painting" the base coat 16 in some instances.

Figure 2A:
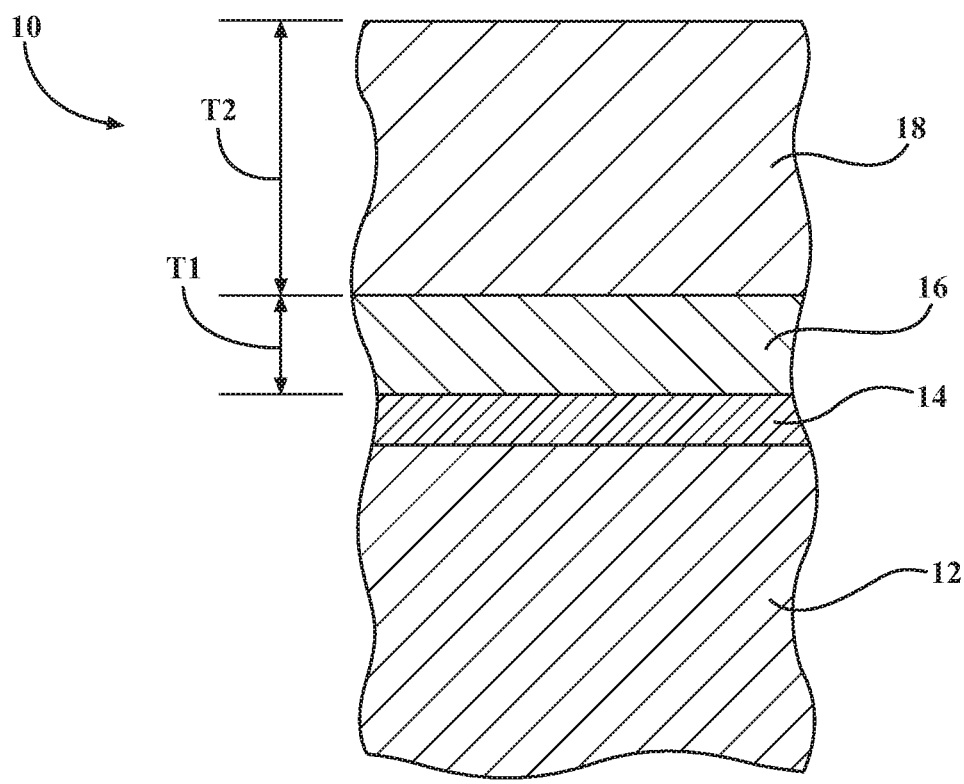
FIG. 2A is a cross-sectional close-up view of a level surface of the plastic substrate of FIG. 1 covered with the layer of hot stamped foil, the primer coat and the clear coat according to aspects of the disclosure.
Figure 2B:
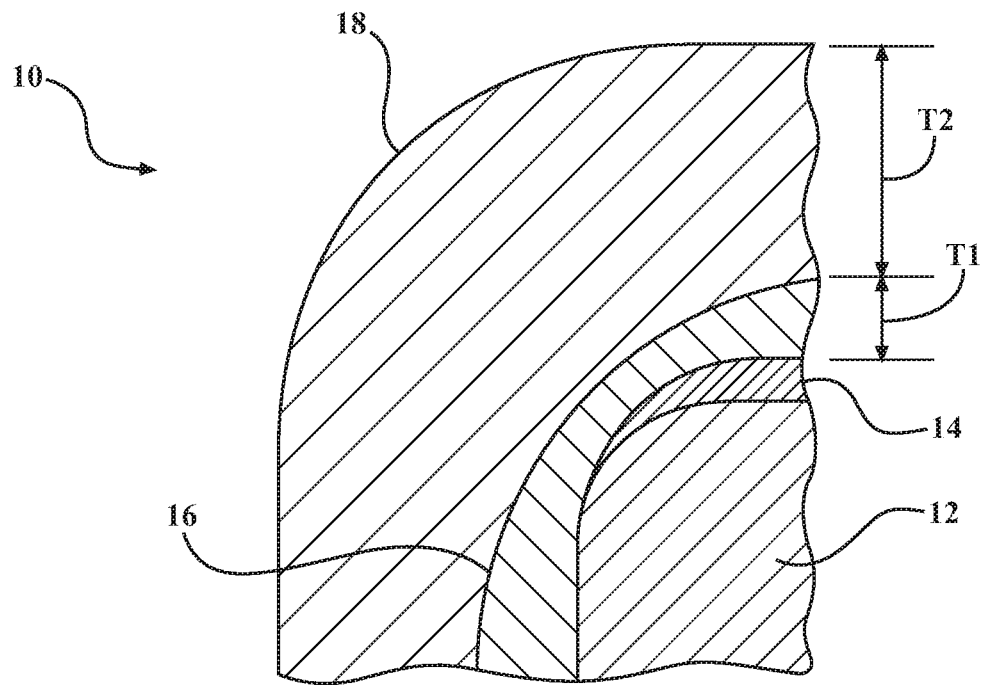
FIG. 2B is a cross-sectional close-up view of an outer radius of the plastic substrate of FIG. 1 covered with the layer of hot stamped foil, the primer coat and the clear coat according to aspects of the disclosure.

Additional detail of the base coat 16 relative to the substrate 12 and the HSF layer 14 is illustrated in FIGS. 2A and 2B, which are close-up illustrations of the system 10 as shown in FIG. 1. FIG. 2B is a close-up of the outer radius 20 of the system 10 shown in FIG. 1 and FIG. 2A is a close-up of the level surface 22 of the system 10 shown in FIG. 1.

FIGS. 2a and 2B illustrate a thickness T1 of the base coat 16. In one aspect, the thickness T1 can be 0.0127 mm (0.5 mils). As shown in FIG. 2B, thickness T1 may decrease around outer radius 20 (as shown in FIG. 1 and FIG. 2B). The base coat 16 is shown in FIGS. 1 and 2B as also being applied to a lateral surface 23 of the substrate 12. Accordingly, the base coat 16 may be applied over each of the lever surface 22, the radius 20, and the lateral surface 23. When applied over the radius 20, the base coat 16 defines a further outer radius 16a, which is larger than the small radius 20 defined by the substrate 12 and the HSF layer 14.

As shown in detail FIGS. 2A and 2B, on top of base coat 16 may be applied a second coating layer 18, which may also be referred to as clear coat 18. Clear coat 18 may be made of Unicoat® R788 (though other clear coats may be used), which is also commercially available from NB Coatings of Lansing, Ill. While the second coating layer 18 is referred to as a clear coat, it will be appreciated that the base coat 16 may also be clear. Unicoat® R788 is a higher viscosity material relative to R925 that is used in the base coat 16. Unicoat® R788 may therefore be applied with a higher thickness than the base coat 16. Additionally, Unicoat® R788 is less brittle and more ductile than R925, and is configured to adhere to the R925 material that was applied as the base coat 16. Moreover, the radius 16a defined by the base coat 16 is larger than radius 20, and the more viscous and ductile R788 can more easily adhere to the larger radius 16a than the smaller radius 20.

The clear coat 18 may be applied in a thicker film than the base coat 16, and can bond with the base coat 16 to provide protection to the base coat 16 due to a higher level of ductility of the clear coat 18 compared to the brittle base coat 16. For example, as shown in FIGS. 2A and 2B, a thickness T2 of the clear coat 18 film can be 0.02286 mm (0.9 mils), though thickness T2 can decrease slightly around radius 16a. The clear coat 18 may be applied over the upper surface, radius, and lateral surface defined by the base coat 16.

FIGS. 1 and 2A-2B therefore illustrate the resulting composite component system 10 defined by applying the HSF layer 14 over the substrate 12, with the subsequently applied base coat 16 and clear coat 18 that cover the HSF layer 14 and substrate 12.

An exemplary method according to aspects of the disclosure begins with the step of providing the ASA substrate 12. The substrate 12 may have a design constraint including one or more proud (i.e., slightly projecting), surfaces with one or more outer radius 20 with a maximum termination of 0.2 mm around the entire periphery (tear edge) of the component. This design constraint can be generally outside what can be considered a normal practice of using a radius with a minimum radius of 1.5 mm for painted surfaces (or applied with HSF and covered with one or more coatings). Accordingly, the 2-component coating system described above may be used to achieve a desirable protective coating for radiuses smaller than the typical minimum radius, such as the relative small radius of 0.2 mm described herein for outer radius 20. It will be appreciated that compound radius may also be employed as discussed above.

In experimental trials, plastic components with proud 0.2 mm radii termination/periphery were covered with HSF and coated (i.e., painted). However, the resulting plastic composites had unacceptable cosmetic/appearance issues (e.g., paint sags, drips, etc.), particularly for a vehicle plastic component where appearance is highly valued.

In other experimental trials where only a base coat (e.g., NB Coatings R925), was applied over the HSF on a similar plastic component, the base coat/HSF plastic component subsequently failed Thermal Shock (Thermal Shock Test for Paint Adhesion GMW 15919) and Water Immersion (Standard Practice for Testing Water Resistance of Coatings Using Water Immersion ASTM D870-15 (38° C. water temperature @ 240 hours immersion) tests. It should be noted that NB R925 base coat is a low-viscosity coating that, due to its low-viscosity, is difficult to build (i.e., apply), a coating thickness with sufficient strength to pass the required tests without resulting in cosmetic/appearance issues. The cosmetic/appearance issues of a thick NB R925 coating cannot also be remedied by a later-applied clear coat, which due to its transparent nature, has no masking/leveling effects that could rectify paint sags or drips.

In other experimental trials, plastic composites were covered with HSF and coated with a NB R788 clear coat (more ductile than NB R925) at a thickness of 0.0381 mm (1.5 mils). While this application may have an improved cosmetic appearance relative to the R925 material, these plastic components failed adhesion tests such as Thermal Shock as a result of attempting to wrap the clear coat around a proud outer radius while also attempting to bond (i.e., adhere), to the HSF and the ASA surface texture transmitted through the HSF, as described in further detail below.

One of the challenges of coating HSF over ASA is that any coating must not only adhere to the HSF but also to the ASA. This is at least partially due to the fact that the ASA has a surface texture. The very thin layer of HSF is typically not sufficient to "fill in" all of the surface texture of the ASA. In many cases, the HSF has little to no effect on the surface texture of the ASA. Thus, any coating must be able to mechanically bond to the combined HSF/ASA surface texture in order for the coating to remain bonded to the HSF/ASA surface (and pass whatever testing the HSF/ASA component is subjected to).

As discussed above, NB R925 is a low-viscosity coating, that typically produces low film builds (without cosmetic/appearance issues that develop with thicker film builds). As shown in FIG. 1 and FIG. 2B, due to the coating process, the NB R925 coating is even thinner around a tight radius. As a result, the even-thinner coating is more vulnerable (and less effective) in curved areas, particularly an outer radius such as outer radius 20. To further complicate matters, NB R925 may have brittle properties that make it vulnerable to at least the Thermal Shock and Water Immersion tests.

For example, during the Thermal Shock test, the ASA component can expand and/or contract, changing its dimensions. Thus the brittle NB R925 coating applied over the HSF on the ASA component can crack or otherwise display damage due to the expansion and/or contraction of the ASA component. Thus, in order to protect the NB R925 coating used in the base coat 16, the additional clear coat 18 is applied over (i.e., on top of), the NB R925 coating. The clear coat 18, for example NB R788, is a more ductile (i.e., flexible), coating and can be applied in a thicker film with little to no cosmetic/appearance issues (as shown in FIGS. 1 and 2A-2B). By applying the R788 clear coat 18 over the NB R925 base coat 16, the HSF/ASA component 10 is provided with superior protection for use in a transportation setting, and may pass common tests for use in a transportation setting (e.g., Thermal Shock, Water Immersion).

Thus, the double coating process using different coating materials with different adhesion abilities and different viscosities and brittleness allows for the use of proud surfaces with tight radiuses to be adequately covered and protected in such a manner as to pass thermal shock and water immersion testing. The low viscosity and thin base coat 16 may be applied to the tight radius 20 and will adhere to the differing surface features of the combination HSF layer 14 and ASA substrate 12. The application of the base coat 16 will create a new outer surface texture and the larger radius 16*a*. The high viscosity and ductile clear coat 18 may be applied over the base coat 16, which is an improved surface texture and profile to receive the thicker clear coat 18.

The two-component coating system 10 for use with HSF-covered plastic components allows for components that can include proud 0.2 mm radius termination/periphery. The ductile clear coat 18 provides support and protection for the brittle base coat 16, and the combination of the two components protects a plastic component 12 with an HSF layer 14. The plastic component 12 with the two-component system can thus meet exterior automotive/transportation performance requirements including, but not limited to, Thermal Shock and Water Immersion.

According to an aspect a need exists for composite component having a low temperature substrate. An exemplary low temperature substrate can include various polyurethanes and/or acrylics. Such substrates require a lower cure.

The foregoing invention has been described in accordance with the relevant legal standards, thus the description is exemplary rather than limiting in nature. Variations and modifications to the disclosed embodiment may become apparent to those skilled in the art and do come within the scope of the invention. Such variations are not to be regarded as a departure from the disclosure, and all such modifications are intended to be included within the scope of the disclosure. Those skilled in the art will recognize that concepts disclosed in association with an example enclosure assembly can likewise be implemented into many other systems to control one or more operations and/or functions. Accordingly, the scope of legal protection afforded this invention can only be determined by studying the following claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A method of applying a two-component coating to a hot stamped foil plastic component comprising:
   providing a plastic substrate;
   applying a foil to the plastic substrate;
   applying a first coating layer over the foil and the plastic substrate, the first coating layer having a first coating thickness and a first viscosity;
   applying a second coating layer over the first coating layer, the second coating layer having a second thickness and a second viscosity;
   wherein the step of applying the foil includes hot stamping the foil to the plastic substrate.

2. The method of claim 1, wherein the plastic substrate is acrylonitrile styrene acrylate.

3. The method of claim 1, wherein the foil is a transfer foil.

4. The method of claim 3, wherein the transfer foil includes an adhesive layer configured to adhere to the plastic substrate, a colored layer configured to provide a desired appearance, and a release layer configured to allow the transfer foil to release from a die.

5. The method of claim 1, wherein the combination of the foil and plastic substrate includes an upper surface and a lateral surface and a peripheral edge therebetween having a maximum radius of 0.2 mm.

6. The method of claim 5, wherein the first coating layer extends over the peripheral edge, the upper surface, and the lateral surface.

7. The method of claim 6, wherein the first thickness of the first coating layer is a variable thickness, wherein the first thickness is relatively larger at the upper surface and relative thinner at the peripheral edge.

8. The method of claim 1, wherein the first coating layer is more brittle than the second coating layer.

9. A method of applying a two-component coating to a hot stamped foil plastic component comprising:
   providing a plastic substrate;
   applying a foil to the plastic substrate;
   applying a first coating layer over the foil and the plastic substrate, the first coating layer having a first coating thickness and a first viscosity;
   applying a second coating layer over the first coating layer, the second coating layer having a second thickness and a second viscosity; and
   wherein the first coating layer adheres to both the foil and the plastic substrate, and the second coating layer adheres to the first layer.

10. A composite decorative component having a multi-layer coating, the component comprising:
    a plastic substrate;
    a hot-stamped foil attached to a first surface of the plastic substrate;
    a first coating layer attached to the hot-stamped foil and the plastic substrate;
    a second coating layer attached to the first coating layer, wherein the second coating layer is thicker than the first coating layer.

11. The component of claim 10, wherein a combination of the plastic substrate and hot-stamped foil has an upper surface, a lateral surface, and a peripheral edge therebetween, the peripheral edge having a maximum radius of 0.2 mm.

12. The component of claim 11, wherein the first coating layer extends over the upper surface, the peripheral edge, and the lateral surface.

13. The component of claim 10, wherein the first coating layer is more brittle than the second coating layer.

14. The component of claim 10, wherein the first coating layer adheres to both the hot-stamped foil and the plastic substrate.

15. The component of claim 12, wherein the first coating layer has a variable thickness, and the first coating layer is thinner at the peripheral edge than at the upper surface.

16. The component of claim 10, wherein the first coating layer is made from a lower viscosity material than the second coating layer.

17. A decorative component for an automobile resistant to thermal shock and water immersion, the decorative component comprising:
    a plastic substrate;
    a foil adhered to the plastic substrate and projecting from the plastic substrate;
    a radiused peripheral edge of the plastic substrate and the foil;
    a primer layer adhered to the plastic substrate and the foil;
    a coating layer adhered to the primer layer.

18. The decorative component of claim 17, wherein the peripheral edge has a maximum radius of 0.2 mm.

19. The decorative component of claim 17, wherein the primer layer is made from a material having a lower viscosity than the coating layer, wherein the primer layer is thinner than the coating layer, and the primer layer is more brittle than the coating layer.

* * * * *